United States Patent
Chauvel-Melscoet et al.

(10) Patent No.: US 9,067,820 B2
(45) Date of Patent: Jun. 30, 2015

(54) TRANSPARENT, COLORLESS, TIN-FINED LAS GLASS-CERAMICS WITH IMPROVED MICROSTRUCTURE AND OPTICAL PROPERTIES

(71) Applicant: Eurokera, Chateau-Thierry (FR)

(72) Inventors: Isabelle Marie Chauvel-Melscoet, Bois-le-Roi (FR); Marie Jacqueline Monique Comte, Fontenay aux Roses (FR)

(73) Assignee: Eurokera, Chateau-Thierry (FR)

( * ) Notice: Subject to any disclaimer, the term of this patent is extended or adjusted under 35 U.S.C. 154(b) by 0 days.

(21) Appl. No.: 13/894,913

(22) Filed: May 15, 2013

(65) Prior Publication Data

US 2014/0135201 A1 May 15, 2014

(51) Int. Cl.
*C03C 10/12* (2006.01)
*C03C 10/14* (2006.01)
*C03C 10/00* (2006.01)
*C03C 3/085* (2006.01)

(52) U.S. Cl.
CPC .......... *C03C 10/0045* (2013.01); *C03C 10/0009* (2013.01); *C03C 10/0027* (2013.01); *C03C 3/085* (2013.01); *C03C 10/0036* (2013.01); *C03C 10/0054* (2013.01)

(58) Field of Classification Search
CPC .. C03C 10/0009; C03C 10/0027; C03C 32/02
USPC ........................................ 501/4, 7
See application file for complete search history.

(56) References Cited

U.S. PATENT DOCUMENTS

| | | | |
|---|---|---|---|
| 4,438,210 A | 3/1984 | Rittler | 501/4 |
| 5,070,045 A | 12/1991 | Comte et al. | 501/4 |
| 6,846,760 B2 | 1/2005 | Siebers et al. | 501/32 |
| 7,981,823 B2* | 7/2011 | Siebers et al. | 501/7 |
| 8,053,381 B2 | 11/2011 | Siebers et al. | 501/4 |
| 8,093,167 B2* | 1/2012 | Yagi et al. | 501/63 |
| 8,143,179 B2* | 3/2012 | Aitken et al. | 501/4 |
| 8,318,619 B2* | 11/2012 | Comte et al. | 501/4 |
| 8,753,991 B2* | 6/2014 | Comte et al. | 501/4 |
| 8,759,239 B2* | 6/2014 | Comte et al. | 501/69 |
| 2002/0023463 A1 | 2/2002 | Siebers et al. | 65/99.5 |
| 2005/0143247 A1 | 6/2005 | Siebers et al. | 501/4 |
| 2007/0232476 A1* | 10/2007 | Siebers et al. | 501/4 |
| 2009/0018007 A1 | 1/2009 | Siebers et al. | 501/63 |
| 2009/0286667 A1 | 11/2009 | Siebers et al. | 501/59 |
| 2010/0099546 A1 | 4/2010 | Aitken et al. | 501/4 |
| 2010/0130341 A1* | 5/2010 | Wondraczek | 501/4 |
| 2010/0167903 A1 | 7/2010 | Comte et al. | 501/27 |
| 2011/0071011 A1 | 3/2011 | Fujisawa et al. | 501/69 |
| 2011/0136651 A1* | 6/2011 | Yagi et al. | 501/7 |
| 2012/0302422 A1 | 11/2012 | Siebers et al. | 501/32 |

FOREIGN PATENT DOCUMENTS

JP  2001-316132  11/2001

OTHER PUBLICATIONS

European Application No. 1254420, Filed May 15, 2012, Search Report and Written Opinion dated Dec. 19, 2012.

* cited by examiner

*Primary Examiner* — Karl Group
(74) *Attorney, Agent, or Firm* — Michael W Russell

(57) ABSTRACT

Transparent, essentially colorless and non-diffusing β-quartz glass-ceramics and glass compositions for forming the same have a composition, free of arsenic oxide, antimony oxide and rare earth oxides except for inevitable trace amounts, which contains, expressed as percentages by weight of oxides 62-72% of $SiO_2$, 20-23% of $Al_2O_3$, 2.8-5% of $Li_2O$, 0.1-0.6% of $SnO_2$, 1.9-4% of $TiO_2$, 1.6-3% of $ZrO_2$, less than 0.4% of MgO, 2.5-6% of ZnO and/or BaO and/or SrO, less than 250 ppm of $Fe_2O_3$; and their crystallites present in the β-quartz solid solution have an average size of less than 35 nm. The glass-ceramics exhibit low thermal expansion and are easily obtained at an industrial scale.

13 Claims, No Drawings

TRANSPARENT, COLORLESS, TIN-FINED LAS GLASS-CERAMICS WITH IMPROVED MICROSTRUCTURE AND OPTICAL PROPERTIES

CROSS-REFERENCE TO RELATED APPLICATIONS

This application claims the benefit of priority under 35 U.S.C. §365 of International Patent Application Serial No. PCT/EP2013/060099 filed on May 15, 2013, which in turn claims the benefit of priority under 35 U.S.C. §119 of French Patent Application Serial No. 1254420 filed May 15, 2012, the entire contents of which are incorporated herein by reference.

BACKGROUND

The disclosure relates to the field of transparent, essentially colorless and non-diffusing β-quartz glass-ceramics. More particularly it relates to transparent, essentially colorless and non-diffusing glass-ceramics of the lithium aluminosilicate type, containing a solid solution of β-quartz as the main crystalline phase, free of $As_2O_3$ and of $Sb_2O_3$, articles comprising said glass-ceramics, and lithium aluminosilicate glasses as precursors of such glass-ceramics, as well as methods for elaborating said glass-ceramics and said articles.

The disclosed glass-ceramics exhibit very interesting optical properties, e.g., in terms of transmission, non-diffusion and yellow index. Moreover, they have low thermal expansion and are easily obtained insofar as their precursor glasses have low viscosity at high temperatures, viscosities at liquidus compatible with their forming method, and ceramming cycles of short duration.

The Applicant has been producing and marketing since the early 1990's, β-quartz glass-ceramics from precursor lithium aluminosilicate glasses having low thermal expansion coefficients ($<10\times10^{-7}$ $K^{-1}$ between 25 and 700° C., e.g., between $-3$ and $+3\times10^{-7}$ $K^{-1}$ between 25 and 700° C.). Such glass-ceramics may be sued, for example, as cooking top plates, cooking utensils, microwave oven plates, chimney windows, fireplace inserts, fireproof doors and windows, stove and oven windows, notably with pyrolysis or catalysis, and as shields such as transparent armor. The glass-ceramics may be colored, more or less transparent (e.g., black cooking top plates) or transparent, non-colored (e.g., shields, fireproof doors and windows, and cooking top plates for induction heating, optionally with colored lower layers which are desirably perfectly visible).

For obtaining such glass-ceramics (more specifically for removing gas inclusions from the precursor molten glass mass) fining agents such as $As_2O_3$ and/or $Sb_2O_3$ have been used for a long time. The use of these fining agents is notably illustrated in U.S. Pat. Nos. 4,438,210 and 5,070,045. For instance, U.S. Pat. No. 4,438,210 teaches that Ti—Fe interactions would be responsible for the appearance of a coloration upon ceramming and that the absence of MgO would give the possibility of avoiding this coloration; this, in the presence of $As_2O_3$.

With view to the toxicity of $As_2O_3$ and of increasingly strict regulations in effect, this toxic fining compound is desirably no longer used. For environmental considerations, it is also desired to no longer use $Sb_2O_3$ and not to use halogens, such as F and Br, which would have been able to replace at least partly said fining agents $As_2O_3$ and $Sb_2O_3$.

$SnO_2$ was proposed as a replacement fining agent. It is increasingly used to this day. It is notably timely used when the precursor glass of the glass-ceramic (glass plate precursors of glass-ceramic plates, in fact) is obtained by floating. Indeed, applied with glasses containing $As_2O_3$ and/or $Sb_2O_3$ in their composition, such a floating method generates glass plates with a metal deposit at their surface (a metal deposit resulting from the reduction of $As_2O_3$ and/or $Sb_2O_3$). U.S. Pat. Nos. 6,846,760 and 8,053,381 thus describe the obtaining of glass-ceramics from glasses, themselves obtained by floating and the composition of which contains $SnO_2$ as a fining agent.

The use of $SnO_2$ as a fining agent however has two major drawbacks. This compound is less efficient than $As_2O_3$ (and, in absolute terms, it should therefore be used in a relatively large amount, which is not without posing any problems, more particularly of devitrification) and, as a more powerful reducing agent than $As_2O_3$ and $Sb_2O_3$, it is responsible for the appearance of an undesirable yellowish coloration during ceramming. This second drawback is of course a real nuisance when it is sought to obtain transparent, essentially colorless glass-ceramics.

This yellowish coloration results from Sn—Fe, Sn—Ti and Ti—Fe interactions, i.e., by way of charge transfer. One skilled in the art is actually aware that glass-ceramic precursor glass compositions inevitably contain iron and generally $TiO_2$ as a nucleation agent.

In order to limit or even avoid this yellowish coloration phenomenon, which is quite undesirable, within a context for preparing transparent, essentially colorless glass-ceramics, two different approaches have been suggested to this day.

The first includes adding into the composition of the precursor glass at least one complementary coloring agent or compensating dye, which may also be described as a discoloration agent. The use of $Nd_2O_3$ for this purpose was described in U.S. Pat. No. 8,053,381 already mentioned above. Glass-ceramic plates containing this dye, in a substantial amount, are to this day marketed by Schott (DE) under the trademark Pyran® Platinum. The use of expensive dyes of this type, however, is detrimental to the transmission of glass-ceramics. It inevitably causes a loss of a few percents of the integrated transmission.

The second approach, in order to limit or even avoid any Sn—Ti and Ti—Fe interaction, includes limiting or even avoiding the presence of $TiO_2$ within the composition of the precursor glasses.

Both of these alternatives—presence of $TiO_2$ at a limited level and absence of $TiO_2$—were respectively described in commonly-assigned US Patent Application Publication Nos. 2010/0167903 and US 2010/0099546. They also have drawbacks. Compositions without $TiO_2$ or with a limited $TiO_2$ content require ceramming treatments of long duration. Moreover, compositions without $TiO_2$ possess very high liquidus temperatures and are difficult to produce at an industrial scale.

JP patent application 2001-316132 discloses transparent β-quartz glass-ceramics of the lithium aluminosilicate type. The disclosed materials have a thermal expansion coefficient approximating the silica, as well as a high UV transmittance. Such glass-ceramics are more particularly suitable for case material of a device of optical communication such as an optical coupler. Their composition contains 50 ppm or less of $Fe_2O_3$. Such a requirement is very severe and implies the use of raw materials having a high degree of purity. Obtaining such a low level of iron is very difficult and expensive under industrial conditions.

SUMMARY

In such context, disclosed herein are transparent, essentially colorless (having a minimized yellow index), and non-diffusing β-quartz glass-ceramics of the lithium aluminosilicate type, obtained under easily industrializable application conditions, from lithium aluminosilicate glass compositions free of $As_2O_3$ and of $Sb_2O_3$, containing $SnO_2$ as a fining agent, $TiO_2$ and $ZrO_2$ as nucleation agents (one skilled in the art being aware that $SnO_2$ also acts as a nucleation agent) and not containing any rare earth oxide, which may provide the compensating coloring agent function.

The glass-ceramics of the present disclosure have optical properties that are competitive with glass-ceramics of the prior art of the same type obtained with the use of $As_2O_3$ as a fining agent. They generally have yellow indexes of less than 14, or even of less than 12, for a thickness of 5 mm, an integrated transmission of more than 81%, or even more than 84%, for the same thickness as well as a diffusion percentage at this thickness, of less than 2.5%, or even less than 1.5%. The glass-ceramics also have a low thermal expansion coefficient.

The disclosed materials are obtained at the end of short duration ceramming cycles insofar as they contain an effective amount of nucleation agents, notably of $TiO_2$. They are easily obtained, as indicated above and specified below, with easy application, even at an industrial scale.

DETAILED DESCRIPTION

According to a first embodiment, the present disclosure relates to glass-ceramics of the lithium aluminosilicate (LAS) type. Compositionally, they contain $Li_2O$, $Al_2O_3$ and $SiO_2$ as essential constituents of the β-quartz solid solution, and a β-quartz solid solution as a main crystalline phase. In embodiments, the β-quartz solid solution accounts for more than 80% by weight of the total crystallized fraction. It may generally account for more than 90% by weight of said total crystallized fraction. The glass-ceramics concerned are transparent, essentially colorless and non-diffusing.

The transparence is apprehended here by the integrated transmission TL (%), as defined by the ASTM D1003-00 standard. Standard integrated transmission measurements cover the spectral range of 380-780 nm.

Said transparence is as high as possible. The disclosed glass-ceramics are transparent glass-ceramics in that they have for a thickness of 5 mm, an integrated transmission of more than 81%, e.g., more than 84%.

The essentially colorless nature is apprehended here by the yellow index (YI). The formula for calculating this index, known to one skilled in the art, is the following: $YI_{ASTM\ E313}=[100\times(1.28X-1.06Z)]/Y$, wherein X, Y and Z represent the tristimulus coordinates of the sample, calculated for a CIE illuminate C and an observer at 2°.

Said yellow index is as low as possible. The glass-ceramics are essentially colorless glass-ceramics in that they have for a thickness of 5 mm, a yellow index of less than 14, e.g., less than 12 or less than 10.

The disclosed glass-ceramics should not have a diffusing nature. Indeed, the lower the diffusion, the better the appearance and therefore the optical quality of the material. The diffusion is calculated in the following way: % Diffusion= (Tdiffuse/Ttotal)×100, Tdiffuse being the integrated diffused transmission (%) and Ttotal being the integrated transmission (%). The measurement of diffusion is carried out according to the ASTM D1003-00 standard (with the use of an integrating sphere).

The glass-ceramics are essentially non-diffusing in that they have, for a thickness of 5 mm, a diffusion percentage of less than 2.5%, e.g., less than 1.5%.

The glass-ceramics, the precursor glass of which was fined with $SnO_2$, are, with reference to these notions of transparence, are free of coloration, e.g., yellow coloration as discussed above, and have a non-diffusing nature, as performing as glass-ceramics of the prior art, the precursor glass of which was fined with $As_2O_3$ and/or $Sb_2O_3$, such as those described in U.S. Pat. No. 5,070,045.

The glass ceramics disclosed herein present an interesting low thermal expansion, i.e., CTE<$10\times10^{-7}$ $K^{-1}$ between 25 and 700° C., e.g., between −3 and $+3\times10^{-7}$ $K^{-1}$ between 25 and 700° C.

The glass ceramics, in addition, are easily obtained, even at an industrial scale. In one embodiment, their precursor glasses display a low viscosity at high temperature. A temperature $T_{300\ poises}$<1,690° C. is targeted (e.g., $T_{300\ poises}$<1,670° C., e.g., $T_{300\ poises}$<1,660° C.). As the glasses are fined without arsenic oxide but with tin oxide, it has been observed that a low viscosity at high temperature is advantageous to favor fining. In a further embodiment, their precursor glasses display a high resistance to devitrification with a liquidus temperature lower than 1400° C. and a viscosity at the liquidus higher than 3000 Poises. Such characteristics are compatible with float or rolling processes. In a still further embodiment, they may be obtained at the end of short duration crystallization thermal treatments cycles insofar that they contain an effective amount of nucleation agents, notably of $TiO_2$. The duration of this thermal treatment is obviously very dependent on the furnace used and of the size of the pieces concerned. However on lab samples ceramming can be performed in less than 3 hours.

A composition of the disclosed glass-ceramics, free of arsenic oxide, antimony oxide and rare earth oxide, except for inevitable trace amounts, contains, expressed as percentages by weight of oxides:
  62-72% of $SiO_2$,
  20-23% of $Al_2O_3$,
  2.8-5% of $Li_2O$,
  0.1-0.6% of $SnO_2$,
  1.9-4% of $TiO_2$,
  1.6-3% of $ZrO_2$,
  less than 0.4% of MgO,
  2.5-6% of ZnO and/or BaO and/or SrO,
  less than 250 ppm of $Fe_2O_3$; and
  the crystallites present in the β-quartz solid solution (in large majority in the crystalline phase) have an average size of less than 35 nm, e.g., less than 30 nm.

The average crystallite size is measured by using a Rietveld refinement method of X-ray diffraction spectra.

In further embodiments, the composition of the glass-ceramics (of the LAS type) contains:
  from 62 to 72% of $SiO_2$,
  from 20 to 23% of $Al_2O_3$, and
  from 2.8 to 5% of $Li_2O$.

The $SiO_2$ content (≥62%) should be suitable for obtaining a sufficiently viscous precursor glass, in order to limit the problems of devitrification. The $SiO_2$ content is limited to 72% insofar that the higher the $SiO_2$ content, the more difficult it is to melt the composition. In an example embodiment, the SiO2 content ranges from 63 to 69% inclusive.

With regards to $Al_2O_3$, excessive amounts (>23%) make the composition more prone to devitrification (e.g., to the formation of mullite), which is not desirable. Conversely, too small amounts (<20%) are unfavorable for nucleation and for forming small β-quartz crystallites. A content between 20 and 22% (limits included) may be included.

With respect to $Li_2O$, excessive amounts (>5%) are favorable to devitrification while too small amounts (<2.8%) significantly increase the high temperature viscosity. Contents of $Li_2O$ between 3 and 4.5 (limits included) and between 3 and 4 (limits included) may be included.

The composition of the disclosed glass-ceramics contains neither $As_2O_3$ nor $Sb_2O_3$, or only contains traces of at least one of these compounds. The disclosed glass-ceramics include $SnO_2$ instead of and in place of these fining agents. If trace amounts of at least one of these compounds are present, this is as a contaminating compound, due for example to the presence in the batch mixture of raw materials able to vitrify, of recycled materials of cullet type (from former glass-ceramics refined with these compounds). In any case, only trace amounts of these toxic compounds may be present such that $As_2O_3+Sb_2O_3<1,000$ ppm.

The composition of the glass-ceramics does not contain any rare earth oxide, i.e., coloring agents, such as $Nd_2O_3$, capable of providing the role of a discoloration agent or compensating coloring agent, in the presence of $SnO_2$ as a fining agent. Such a rare earth oxide is not added intentionally and its content in the composition of the glass-ceramics, if not equal to 0, is in any way 50 ppm or less.

With the incorporation of $SnO_2$ as a fining agent, disclosed are glass-ceramic compositions that contain a substantial amount of $TiO_2$, and which display desired optical properties including optical transmission, diffusion and yellow index properties. The disclosed approach is different, in the absence of a rare earth oxide, from that of U.S. Pat. No. 8,053,381, and also different from that according to US Patent Application Nos. 2010/0099546 and 2010/0167903.

The compositions of the glass-ceramics contain effective amounts of a fining agent, i.e., from 0.1 to 0.6% of $SnO_2$ and of nucleation agents, i.e., from 1.9 to 4% of $TiO_2$ and from 1.6 to 3% of $ZrO_2$.

The disclosed approach may include: a) the absence or the presence of MgO only in a low content (less than 0.4%), b) the presence of a low $Fe_2O_3$ content (less than 250 ppm), and c) the presence of small β-quartz crystallites.

It has been surprisingly shown that by minimizing the MgO content, it is both possible to considerably increase (maximize) the integrated transmission and to notoriously reduce (minimize) the yellow index. Though the absence of MgO has been considered in order to avoid a brownish coloration in a system fined with arsenic, it was not obvious that minimizing, or even completely avoiding the presence of MgO would be beneficial to the lowering of the yellow index and to the maximization of the transmission in a system fined with tin. Moreover the difficulty was to determine which element(s) is (are) able to compensate for MgO, keeping an acceptable set of properties. For LAS type glasses, MgO can decrease high temperature viscosity, improve devitrification, and have an intermediate effect on CTE. It has been found that ZnO and/or BaO and/or SrO are suitable substitutes.

A limited $Fe_2O_3$ content (<250 ppm) allows limitation of the Fe—Ti and Fe—Sn interactions, thereby minimizing color and maximizing integrated transmission.

It was also observed that a small average size of β-quartz crystallites (<35 nm, e.g., <30 nm) is favorable for obtaining high integrated transmission and low coloration. This small average crystallite size is related to the quality of nucleation, therefore to the presence of nucleation agents such as $TiO_2$, in an amount of 1.9-4% by weight (e.g., between 2 and 3% by weight) and $ZrO_2$, in an amount of 1.6-3% by weight (e.g., between 1.6 and 2% by weight) and to the ceramming. Moreover, one is aware that the fining agent $SnO_2$ is also involved in the nucleation process.

With regards to the low diffusion percentage exhibited by the glass-ceramics, it is also related to the size of the crystallites, as well as to their number. It may depend, for example, on the quality of nucleation, and therefore on the presence of nucleation agents and of the ceramming heat treatment.

The disclosed glass-ceramics therefore have crystallites (present in the β-quartz solid solution, which is in a large majority in the crystalline phase) with an average size of less than 35 nm, e.g., 30 nm (these values may be compared with the values of 40-61 nm given for the exemplified glass-ceramic crystallites of U.S. Pat. No. 6,846,760), and a composition free of $As_2O_3$, $Sb_2O_3$ and of rare earth oxide.

The disclosed compositions include $SnO_2$ as a fining agent, in an amount of 0.1-0.6% (e.g., 0.1-0.4%) by weight. The presence of $SnO_2$ promotes the final quality of the glass-ceramic. Said $SnO_2$ also contributes to nucleation. However, it is incorporated in a limited amount (≥0.6%) in order to avoid discoloration and high temperature devitrification.

The disclosed glass-ceramics include $TiO_2$ and $ZrO_2$ as nucleation agents. The amount of $TiO_2$ may range from 1.9-4% (e.g., 2-3%), and the amount of $ZrO_2$ may range from 1.6-3% (e.g., 1.6-2%).

The presence of $ZrO_2$ allows a limitation of $TiO_2$ presence. Said $TiO_2$ is present in an adequate amount for the sought effect on nucleation but in a limited amount with reference to the technical coloration problem. Said $ZrO_2$ completes the action of said $TiO_2$ on nucleation, but cannot be involved in a larger amount insofar that it then generates devitrification problems.

MgO is included in the composition in a small amount (less than 0.4%, e.g., less than 0.1%), with reference to the sought strong transmission and low yellow index. The composition of the glass-ceramics in embodiments may be free of MgO except for inevitable trace amounts. It is understood that according to this alternative, MgO is not added and may only be present as trace amounts (of less than 500 ppm), notably because of the use of recycled raw materials.

One or more of ZnO, BaO and SrO may be included for compensating the low MgO content, or even the absence of MgO, and most particularly (a) for maintaining the high temperature viscosity of the precursor glasses to acceptable values (a temperature $T_{300\,poises}<1,690°$ C. is targeted, e.g., $T_{300\,poises}<1,670°$ C., e.g., $T_{300\,poises}<1,660°$ C.) for applying the melting step as well as an effective fining, (b) for obtaining an interesting thermal expansion coefficient of the glass-ceramics (CTE<$10\times10^{-7}$ $K^{-1}$ between 25 and 700° C., e.g., between −3 and +$3\times10^{-7}$ $K^{-1}$ between 25 and 700° C.), and (c) a consequent provision of ZnO and/or BaO and/or SrO is provided such that 2.5%≤(ZnO+BaO+SrO)≤6%, e.g., 3.5%≤ (ZnO+BaO+SrO)≤5%). The compositions of the glass-ceramics therefore contain, in consequent amounts, ZnO and/or BaO and/or SrO. In embodiments, said compositions do not contain SrO (no added SrO, an expensive raw material) and therefore contain: 2.5%≤(ZnO+BaO)≤6%, e.g., 3.5%≤ (ZnO+BaO)≤5%.

In embodiments, the glass-ceramic compositions contain from 0.4 to 3% of ZnO, e.g., from 1.6 to 2% of ZnO. ZnO may be used lowering the high temperature viscosity of the precursor glass as well as for lowering the thermal expansion coefficient of the glass-ceramic. A large amount of ZnO (ZnO is then at most involved in an amount of 6% (e.g., 5%) by weight, e.g., at most in an amount of 3% (e.g., 2%) by weight) may significantly lower the thermal expansion coefficient of the glass-ceramic; and from 0 to 5% of BaO, e.g., from 2.1 to 5% of BaO (e.g., from 2.1 to 4%; e.g. from 2.5 to 4%) where BaO also has the property of lowering the high temperature viscosity of the glass. BaO is less efficient than ZnO to decrease the high temperature viscosity but it gives the possibility of limiting devitrification and adjusting the CTE. Surprisingly, it has been found that an increase of BaO is less detrimental to properties than corresponding increases of CaO, Na$_2$O and K$_2$O. It has especially no negative impact on optical diffusion. A large amount of BaO (BaO is at most involved in an amount of 6% by weight, e.g., at most in an amount of 5% by weight) may result in insufficient formation of β-quartz.

The compositions of the glass-ceramics may contain from 2.5 to 5% of BaO.

Within the scope of these embodiments, the compositions disclosed herein may contain from 0 to 5% of SrO. In a variant, the compositions do not contain any SrO (SrO<1000 ppm).

The compositions of the glass-ceramics of the invention generally contain both ZnO and BaO (with or without SrO, advantageously without SrO).

According to further embodiments, the glass-ceramics may contain from 0.4 to 3% of ZnO, from 2.1 to 5% of BaO and from 0 to 5% of SrO. In such embodiments, the glass-ceramics may include no SrO or less than 1000 ppm SrO. The sub-ranges, 1.6 to 2 for ZnO and 2.5 to 5 for BaO, independently or in combination, obviously exist within said variant.

According to another variant, the glass-ceramics contain from 0.4 to 2% of ZnO and 2.1 to 5% of BaO (and no SrO, in any way less than 1000 ppm of SrO) in their composition.

According to these variants, the properties of the glass-ceramic are more particularly optimized in term of high temperature viscosity, devitrification, transmission, color and CTE).

The disclosed glass-ceramic compositions may include Fe$_2$O$_3$, i.e., less than 250 ppm, e.g., less than 180 ppm, though it is generally difficult to obtain a value below 100 ppm because of the presence of iron in the raw materials used). The compositions of the glass-ceramics typically contain Fe$_2$O$_3$ at a content between 70 ppm (see examples 3 and 4) and less than 250 ppm, more usually Fe$_2$O$_3$ at a content between 80 ppm and less than 180 ppm, and still more usually Fe$_2$O$_3$ at a content between 100 ppm and less than 180 ppm. It was understood that here also, Sn—Fe, Ti—Fe charge transfers, responsible for coloration (which one seeks to avoid) should be limited. It has to be emphasized that the glass-ceramics show very interesting optical properties without requiring a very low level of Fe$_2$O$_3$ within their composition.

The disclosed glass-ceramics are of the lithium aluminosilicate type and contain a β-quartz solid solution as a main crystalline phase, said β-quartz solid solution accounting for more than 80% by weight of the total crystallized fraction. In fact, said β-quartz solid solution generally accounts for more than 90% by weight of said total crystallized fraction.

According to an embodiment, the composition, expressed as a percentage by weight of oxides, contains, for at least 97% (preferably for at least 99%, or even for 100%) of its weight:

SiO$_2$ 62-72
Al$_2$O$_3$ 20-23
Li$_2$O 2.8-5
TiO$_2$ 1.9-4
ZrO$_2$ 1.6-3
SnO$_2$ 0.1-0.6
MgO less than 0.4%
ZnO 0.4-3
BaO 0-5, e.g., 2.1-5
SrO 0-5
CaO 0-1
Na$_2$O 0-1
K$_2$O 0-1
Fe$_2$O$_3$ less than 250 ppm
CoO 0-30 ppm
P$_2$O$_5$ 0-3.

Said composition comprises 2.5%≤ZnO+BaO+SrO≤6%, e.g., 3.5%≤ZnO+BaO+SrO≤5%. In some embodiments the composition is free of SrO. The teachings given above for each one of the compounds (more particularly for MgO and Fe$_2$O$_3$) of the compositions of the glass-ceramics apply for said specified composition.

The components listed above may quite account for 100% by weight of the composition but the presence of at least one other compound in a small amount (of less than or equal to 3% by weight) cannot a priori be totally excluded, substantially not affecting the properties of the glass-ceramic.

The following elements may notably be present, at a total content of less than or equal to 3% by weight, each of them at a total content of less than or equal to 2% by weight: Nb$_2$O$_5$, Ta$_2$O$_5$, WO$_3$ and MoO$_3$.

With regards to Na$_2$O, K$_2$O and CaO, they may be incorporated, with reference to the high temperature viscosity (the more they are present, the more said viscosity decreases) and to the thermal expansion coefficient (they allow adjustment of this coefficient by increasing it). Used in too large amounts (>1%), however, they are detrimental to color and increase diffusion of the final glass-ceramic.

The presence of CoO may be advisable for optimizing the optical properties. CoO is an inexpensive coloring oxide (it is not a rare earth oxide), the presence of which, in a very small amount than (≤30 ppm, generally ≤than 10 ppm), may further improve a yellow index which is already very low. The presence of more than 30 ppm of CoO gives the glass-ceramic a pink color.

P$_2$O$_5$ may be included as a manufacturing aid; it is notably involved for lowering the high temperature viscosity, in order to promote dissolution of ZrO$_2$ and for limiting devitrification. Its presence is however in no way compulsory. Without any P$_2$O$_5$ or in the presence of very weak amounts of P$_2$O$_5$ (2%, and less than 2%), it is quite possible obtaining example glass-ceramics.

The disclosed compositions are free of As$_2$O$_3$, of Sb$_2$O$_3$, of rare earth oxide. The disclosed compositions may also be free of MgO.

The disclosed glass-ceramics may comprise, expressed as percentages by weight of oxides (for at least 97%, preferably for at least 99%, or even for 100% of its weight):

|  | A | B |
|---|---|---|
| SiO$_2$ | 63-69 | 63-69 |
| Al$_2$O$_3$ | 20-22 | 20-22 |
| Li$_2$O | 3-4.5 | 3-4 |
| TiO$_2$ | 2-3 | 2-3 |
| ZrO$_2$ | 1.6-2 | 1.6-2 |
| SnO$_2$ | 0.1-0.4 | 0.1-0.4 |
| MgO | less than 0.1% | less than 0.1% |
| ZnO | 0.4-2 | 1.6-2 |
| BaO | 2.1-5, advantageously from 2.1-4 | 2.1-5, advantageously from 2.5-5 |
| CaO | 0-1 | 0-1 |
| Na$_2$O | 0-1 | 0-1 |
| K$_2$O | 0-1 | 0-1 |
| Fe$_2$O$_3$ | less than 180 ppm | less than 180 ppm |
| CoO | 0-10 ppm | 0-10 ppm |
| P$_2$O$_5$ | 0-2 | 0-2. |

The compositions A and B above disclosed comprise (in the absence of SrO): 2.5%≤ZnO+BaO≤6%, e.g., 3.5%≤ZnO+BaO≤5%. The teachings given above for each one of the compounds (more particularly for BaO, for MgO and for Fe$_2$O$_3$) of the compositions of the glass-ceramics apply for said compositions A and B. Said compositions may moreover contain under conditions specified above, $Nb_2O_5$, $Ta_2O_5$, $WO_3$ and $MoO_3$.

The disclosed glass-ceramics according to embodiments (the precursor of glass of which has been fined with $SnO_2$) have an integrated transmission, for a thickness of 5 mm, of more than 81%, e.g., more than 84%, a yellow index, for a thickness of 5 mm of less than 14, e.g., less than 12 or less than 10, and a diffusion percentage for a thickness of 5 mm, of less than 2.5%, e.g., less than 1.5%.

According to further embodiments, the present disclosure relates to articles at least partly comprising a glass-ceramic composition disclosed herein. Said articles may totally consist of such a glass-ceramic. Said articles may notably be a fireproof door or window, or form a cooking top plate (for induction heating with colored lower layers, for example, which are desirably perfectly visible) or in a shield such as transparent armor.

According to further embodiments, the present disclosure relates to lithium aluminosilicate glasses as precursors of the disclosed glass-ceramics. Said glasses have a composition with which said glass-ceramics may be obtained. Said glasses generally have a composition which corresponds to that of said glass-ceramics (but the matching is not inevitably complete insofar as one skilled in the art understands that the heat-treatments imposed to the glasses for obtaining the glass-ceramics may somewhat affect the composition of the material). Said glasses are particularly of interest in that they have a high temperature viscosity (low viscosity) as well as interesting devitrification properties (see above), compatible with the application of forming methods by lamination and floating.

According to still further embodiments, the present disclosure respectively relates to a method for elaborating a glass-ceramic as described above, and to a method for elaborating an article comprising such a glass-ceramic.

A method for elaborating a glass-ceramic comprises the heat treatment of a batch mixture of raw materials able to vitrify, containing $SnO_2$ as fining agent, under conditions which provide melting, fining and ceramming by a first nucleation step and a second step for growing crystals.

Said batch mixture has a composition with which a glass-ceramic can be obtained, having the weight composition indicated above and said ceramming is applied in a temperature interval between 650 and 850° C., for 15 minutes to 4 hours, for the nucleation step, and in a temperature interval between 860 and 935° C., for 10 minutes to 2 hours, for the crystal growth step.

The ceramming applied under the conditions above on a glass which has the indicated composition may be used to form a glass-ceramic as disclosed, e.g., in terms of the β-quartz crystallites size.

Optimization of optical properties of the glass-ceramic can be obtained by acting on the composition of the batch mixture and on the parameters of the ceramming cycle.

In various embodiments, said method for elaborating an article comprises melting a batch mixture of raw materials able to vitrify, said batch mixture containing $SnO_2$ as fining agent; followed by fining the obtained molten glass; cooling the obtained fined molten glass and simultaneously shaping it into the desired shape for the intended article; and ceramming the shaped glass, said ceramming (heat treatment) comprising a first nucleation step and a second crystal growth step.

Said batch mixture has a composition with which a glass-ceramic can be obtained, having the weight composition indicated above and the ceramming heat treatment is applied in a temperature interval between 650 and 850° C., for 15 minutes to 4 hours for the nucleation step, and in a temperature interval between 860 and 935° C., for 10 minutes to 2 hours for the crystal growth step.

The ceramming applied under the conditions above on a glass which has the indicated composition may be used to form a glass-ceramic as disclosed, e.g., in terms of the β-quartz crystallites size.

Optimization of the optical properties of the glass-ceramic can be obtained by acting on the composition of the batch mixture and on the parameters of the ceramming cycle.

The ceramming heat treatment, as characterized above, ensures nucleation (a nucleation step applied at least 650° C.) and the obtaining of a glass-ceramic containing a β-quartz solid solution as a main crystalline phase (a crystal growth step applied at a temperature not exceeding 935° C.).

If the nucleation temperature interval is not suitable (i.e. out of the indicated range of 650-850° C.) or if the time in this interval is too short (of less than 15 mins), there will not be sufficient formation of seeds and the material then tends to be a diffusing material.

Moreover, if the growth temperature is too low (below 860° C.), the obtained glass-ceramics tend to exhibit significant diffusion, and if said growth temperature is on the contrary too high (i.e. >935° C.), the obtained glass-ceramics tend to become opaque.

Obtaining the glass-ceramics from a precursor glass obtained by floating is contemplated.

EXAMPLES

In order to produce 1 kg precursor glass batches, the raw materials, in the proportions (proportions expressed as oxides) as copied into the first portion of Table 1 (1A-1F) hereafter, were carefully mixed.

The mixtures were placed for melting in platinum crucibles. The crucibles containing said mixtures were then introduced into an oven preheated to 1,550° C. They underwent therein a melting cycle of the type hereafter:
  rise in temperature from 1,550° C. to 1,650° C., in 2 h;
  maintaining 1,650° C. for between 5.5 h and 16 h.

The crucibles were then taken out of the oven and the molten glass was poured on a preheated steel plate. It was laminated thereon down to a thickness of 6 mm. Glass plates were thereby obtained. They were annealed at 650° C. for one hour and then gently cooled.

The properties of the obtained glasses are indicated in the second portion of Table 1 hereafter.

$T_{300poises}$(° C.) corresponds to the temperature at which the viscosity of the glass is 300 poises.

$T_{liq}$(° C.) is the liquidus temperature. In fact, the liquidus is given by an interval of temperatures and of associated viscosities: the highest temperature corresponds to the minimum temperature at which no crystal is observed, the lowest temperature to the maximum temperature at which crystals are observed.

The devitrification characteristics (low and high liquidus temperatures) were determined in the following way. Glass samples (0.5 cm³) were subjected to the following heat treatment:
  introduction into an oven preheated to 1,430° C.,
  maintaining this temperature for 30 mins,
  temperature decrease down to the test temperature, T, at a rate of 10° C./min,
  maintaining this temperature for 17 h,
  quenching the samples.
The possibly present crystals are observed with optical microscopy.

The applied ceramming (in a static oven) is specified in the third portion of the table. In fact, two ceramming cycles were used, called cycle P and cycle C.

These ceramming cycles are described hereafter.

Cycle P:
- rise in temperature from room temperature (25° C.) to the low temperature of the nucleation domain (650° C.), at a heating rate of 30° C./min;
- rise in temperature in the nucleation domain from 650° C. to 820° C., in 80 mins (ramp of 2.2° C./min);
- rise in temperature from 820 to 900° C. in 25 mins (ramp of 3° C./min);
- maintaining at this crystallization temperature of 900° C. for 40 mins;
- lowering the temperature with the thermal inertia of the oven.

Cycle C:
- rise in temperature from room temperature (25° C.) to the low temperature of the nucleation domain (650° C.), at a heating rate of 30° C./min;
- rise in temperature in the nucleation domain from 650° C. to 820° C., in 40 mins (ramp of 4.3° C./min);
- rise in temperature from 820 to 900° C. in 17 mins (ramp of 4.7° C./min);
- maintaining at this crystallization temperature of 900° C. for 15 mins;
- lowering the temperature with the thermal inertia of the oven.

The properties of the obtained ceramics are indicated in the last portion of Table 1 hereafter.

Total and diffuse transmission measurements were carried out under 5 mm by using a Varian spectrophotometer (model Cary 500 Scan), equipped with an integrating sphere. The integrated transmission (TL %) and the diffusion percentage (Diffusion %) according to the ASTM D313 standard were calculated from these measurements.

The yellow index (YI) was calculated according to the transmission measurements (color points) according to the ASTM E313 standard.

The percentage of β-quartz phase (relatively to the total crystallized fraction) as well as the average size of the β-quartz crystals are obtained by using a Rietveld refinement method of X-ray diffraction spectra. The figure between brackets indicates said average size of the crystals in nanometers.

CTE represents the coefficient of thermal expansion (between room temperature and 700° C.).

Examples 1 to 18 (Table 1-A, 1-B, 1-C, 1-D and 1-E) illustrate the invention. Examples 2 and 15 are preferred: they display the best properties in term of optical properties for the glass-ceramics and low viscosity at high temperature for the precursor glasses. Although they are part of the invention, examples 16 and 17 show that an increase of the mean crystal size is detrimental to the transmission, and example 17 shows the benefit of having ZnO in the composition: the glass of example 17 does not contain ZnO and display a higher high temperature viscosity than the ZnO containing glasses. The composition of example 18 includes SrO. It shows a very interesting $T_{300poises}$ but not very good optical properties for the glass-ceramic.

Examples A, B (Table 1-E), C1-C4 (Table 1-F) are comparative examples.

Example A is a glass-ceramic obtained with $As_2O_3$ as a fining agent, and marketed under the name of Keralite.

Example B is a glass-ceramic marketed by Schott under the trademark Pyran® Platinum. Its composition corresponds to the one indicated in U.S. Pat. No. 8,053,381. It is therefore obtained with $SnO_2$ as a fining agent and $Nd_2O_3$ as a (dis)coloration agent (for concealing the yellow color). The presence of $Nd_2O_3$, in significant amounts (2,800 ppm), explains the low transmission (TL): 78.6% for a thickness of 5 mm.

With reference to the comparative examples C1-C4, the comments hereafter are added.

The glass-ceramic of Example C1 contains 1% by weight of MgO. This causes marked lowering of the transmission (TL), coupled with a significant increase in the yellow index (YI).

The glass-ceramic of Example C2 contains 1.4% by weight of $ZrO_2$. This may result in insufficient nucleation and induces a low transmission (TL), a high yellow index (YI), as well as extremely high diffusion.

The glass-ceramic of Example C3 has low integrated transmission (TL), combined with a high yellow index (YI). These unsatisfactory properties are related to the presence of too high MgO and $SnO_2$ contents.

The glass-ceramic of Example C4 contains in its composition neither MgO, nor ZnO, nor BaO, nor SrO, which leads to a very stiff glass, with an extremely elevated high temperature viscosity ($T_{300poises}$=1,714° C.).

TABLE 1-A

|  | Example 1 | Example 2 | Example 3 | Example 4 |
|---|---|---|---|---|
| $SiO_2$ | 65.296 | 66.288 | 65.303 | 65.303 |
| $Al_2O_3$ | 21.12 | 21.00 | 20.62 | 20.62 |
| $Li_2O$ | 3.67 | 3.50 | 3.67 | 3.67 |
| MgO |  |  |  |  |
| ZnO | 1.99 | 1.60 | 1.50 | 0.40 |
| $TiO_2$ | 2.58 | 2.60 | 2.58 | 2.58 |
| $ZrO_2$ | 1.68 | 1.70 | 1.68 | 1.68 |
| $SnO_2$ | 0.30 | 0.30 | 0.30 | 0.30 |
| $As_2O_3$ |  |  |  |  |
| BaO | 2.50 | 2.50 | 3.49 | 4.59 |
| SrO |  |  |  |  |
| ZnO + BaO + SrO | 4.49 | 4.10 | 4.99 | 4.99 |
| $Na_2O$ |  | 0.50 |  |  |
| $K_2O$ | 0.85 |  | 0.85 | 0.85 |
| $Na_2O + K_2O$ |  |  |  |  |
| $P_2O_5$ |  |  |  |  |
| $Nd_2O_3$ |  |  |  |  |
| CoO |  |  |  |  |
| $Fe_2O_3$ | 0.0140 | 0.0120 | 0.0070 | 0.0070 |
| $T_{300poises}$ (° C.) | 1633 | 1650 | 1648 | 1662 |
| $T_{liq}$ (° C.) | 1330-1350 | 1325-1350 | 1340-1350 | 1340-1355 |
| Viscosity at $T_{liq}$ (poises) | 12560-7950 | 13470-9230 | 10550-9080 | 11940-9560 |
| Ceramming | P | P | P | P |
| Optical Properties (5 mm) |  |  |  |  |
| TL (%) | 84.4 | 84.72 | 85.5 | 85.6 |
| YI | 12.3 | 9.33 | 10.9 | 8.7 |
| Diffusion (%) | 1.2 | 0.2 | 0.6 | 0.7 |
| β-quartz % (nm) | 96.6 (21) | 94.7 (26) | 92.1 (22) | 91.1 (22) |
| $CTE_{25-700° C.}$ ($\times 10^{-7} K^{-1}$) | −1.2 | −3.2 | 0.4 | 3.9 |

TABLE 1-B

|  | Example 5 | Example 6 | Example 7 | Example 8 |
|---|---|---|---|---|
| $SiO_2$ | 66.2875 | 66.788 | 65.788 | 66.788 |
| $Al_2O_3$ | 21.00 | 20.50 | 21.50 | 21.00 |
| $Li_2O$ | 3.50 | 3.50 | 3.50 | 3.50 |
| MgO |  |  |  |  |
| ZnO | 1.60 | 1.60 | 1.60 | 1.10 |
| $TiO_2$ | 2.60 | 2.60 | 2.60 | 2.60 |

TABLE 1-B-continued

|  | Example 5 | Example 6 | Example 7 | Example 8 |
|---|---|---|---|---|
| $ZrO_2$ | 1.70 | 1.70 | 1.70 | 1.70 |
| $SnO_2$ | 0.30 | 0.30 | 0.30 | 0.30 |
| $As_2O_3$ |  |  |  |  |
| BaO | 2.50 | 2.50 | 2.50 | 2.50 |
| SrO |  |  |  |  |
| ZnO + BaO + SrO | 4.10 | 4.10 | 4.10 | 3.60 |
| $Na_2O$ | 0.50 | 0.50 | 0.50 | 0.50 |
| $K_2O$ |  |  |  |  |
| $Na_2O + K_2O$ |  |  |  |  |
| $P_2O_5$ |  |  |  |  |
| $Nd_2O_3$ |  |  |  |  |
| CoO |  | 0.0005 |  |  |
| $Fe_2O_3$ | 0.0120 | 0.0120 | 0.0120 | 0.0120 |
| $T_{300poises}$ (°C.) | 1650 |  |  |  |
| $T_{liq}$ (°C.) | 1325-1350 |  |  |  |
| Viscosity at $T_{liq}$ (poises) | 13470-9230 |  |  |  |
| Ceramming | P | P | P | P |
| Optical properties (5 mm) |  |  |  |  |
| TL (%) | 84.6 | 84.6 | 84.5 | 84.8 |
| YI | 8.0 | 10.3 | 9.2 | 8.9 |
| Diffusion (%) | 0.6 | 0.2 | 0.3 | 2.0 |
| β-quartz % (nm) | 94.7 (26) | 95.4 (24) | 96.2 (29) | 95.9 (29) |
| $CTE_{25\text{-}700° C.}$ ($\times 10^{-7} K^{-1}$) |  |  |  | −3.0 |

TABLE 1-C

|  | Example 9 | Example 10 | Example 11 | Example 12 |
|---|---|---|---|---|
| $SiO_2$ | 65.788 | 66.538 | 66.388 | 66.788 |
| $Al_2O_3$ | 21.00 | 21.00 | 21.00 | 21.00 |
| $Li_2O$ | 3.50 | 3.50 | 3.50 | 3.50 |
| MgO |  |  |  |  |
| ZnO | 2.10 | 1.60 | 1.60 | 1.60 |
| $TiO_2$ | 2.60 | 2.35 | 2.60 | 2.60 |
| $ZrO_2$ | 1.70 | 1.70 | 1.70 | 1.70 |
| $SnO_2$ | 0.30 | 0.30 | 0.20 | 0.30 |
| $As_2O_3$ |  |  |  |  |
| BaO | 2.50 | 2.50 | 2.50 | 2.50 |
| SrO |  |  |  |  |
| ZnO + BaO + SrO | 4.60 | 4.10 | 4.10 | 4.10 |
| $Na_2O$ | 0.50 | 0.50 | 0.50 |  |
| $K_2O$ |  |  |  |  |
| $Na_2O + K_2O$ |  |  |  |  |
| $P_2O_5$ |  |  |  |  |
| $Nd_2O_3$ |  |  |  |  |
| CoO |  |  |  |  |
| $Fe_2O_3$ | 0.0120 | 0.0120 | 0.0120 | 0.0120 |
| $T_{300poises}$ (°C.) |  |  |  |  |
| $T_{liq}$ (°C.) |  |  |  |  |
| Viscosity at $T_{liq}$ (poises) |  |  |  |  |
| Ceramming | P | P | P | P |
| Optical properties (5 mm) |  |  |  |  |
| TL (%) | 84.6 | 85.5 | 85.2 | 84.9 |
| YI | 10.1 | 8.3 | 7.9 | 8.6 |
| Diffusion (%) | 0.5 | 0.4 | 0.5 | 0.1 |
| β-quartz % (nm) | 95.8 (25) | 95.3 (27) |  |  |
| $CTE_{25\text{-}700° C.}$ ($\times 10^{-7} K^{-1}$) |  |  |  | −7.6 |

TABLE 1-D

|  | Example 13 | Example 14 | Example 15 | Example 16 |
|---|---|---|---|---|
| $SiO_2$ | 65.788 | 66.2915 | 64.989 | 66.5883 |
| $Al_2O_3$ | 21.00 | 21.00 | 21.80 | 21.30 |
| $Li_2O$ | 3.50 | 3.50 | 4.10 | 3.00 |
| MgO |  |  |  |  |
| ZnO | 1.60 | 1.60 | 0.70 | 1.50 |
| $TiO_2$ | 2.60 | 2.60 | 2.80 | 2.70 |
| $ZrO_2$ | 1.70 | 1.70 | 1.70 | 1.70 |
| $SnO_2$ | 0.30 | 0.30 | 0.28 | 0.30 |
| $As_2O_3$ |  |  |  |  |
| BaO | 2.50 | 2.50 | 3.50 | 2.50 |
| SrO |  |  |  |  |
| ZnO + BaO + SrO | 4.10 | 4.10 | 4.20 | 4.00 |
| $Na_2O$ | 1.00 | 0.50 | 0.12 | 0.40 |
| $K_2O$ |  |  |  |  |
| $Na_2O + K_2O$ |  |  | 0.12 |  |
| $P_2O_5$ |  |  |  |  |
| $Nd_2O_3$ |  |  |  |  |
| CoO |  |  |  |  |
| $Fe_2O_3$ | 0.0120 | 0.0085 | 0.0110 | 0.0117 |
| $T_{300poises}$ (°C.) |  |  | 1617 |  |
| $T_{liq}$ (°C.) |  |  | 1340-1360 |  |
| Viscosity at $T_{liq}$ (poises) |  |  | 6000-8000 |  |
| Ceramming | P | P | P | P |
| Optical properties (5 mm) |  |  |  |  |
| TL (%) | 85.3 | 86.3 | 85.7 | 83.2 |
| YI | 10.8 | 7.1 | 8.6 | 10.9 |
| Diffusion (%) | 1.1 | 0.1 | 0.2 | 0.6 |
| β-quartz % (nm) |  | 94.3 (25) | 96.2 (24) | 95.4 (31) |
| $CTE_{25\text{-}700° C.}$ ($\times 10^{-7} K^{-1}$) |  |  | −2.1 |  |

TABLE 1-E

|  | Example 17 | Example 18 | A | B |
|---|---|---|---|---|
| $SiO_2$ | 66.570 | 64.116 | 67.634 | 65.525 |
| $Al_2O_3$ | 21.10 | 22.20 | 19.84 | 22.50 |
| $Li_2O$ | 3.50 | 4.10 | 3.35 | 4.00 |
| MgO |  |  | 1.29 | 1.02 |
| ZnO |  | 0.80 | 1.57 | 0.43 |
| $TiO_2$ | 2.40 | 2.70 | 2.61 | 1.60 |
| $ZrO_2$ | 1.80 | 1.90 | 1.72 | 1.98 |
| $SnO_2$ | 0.26 | 0.27 |  | 0.40 |
| $As_2O_3$ |  |  | 0.80 |  |
| BaO | 4.00 | 1.80 | 0.81 |  |
| SrO |  | 1.90 |  |  |
| ZnO + BaO + SrO | 4.00 | 4.50 | 2.38 | 0.43 |
| $Na_2O$ | 0.36 | 0.20 | 0.15 | 0.75 |
| $K_2O$ |  |  | 0.21 | 0.20 |
| $Na_2O + K_2O$ |  |  | 0.36 | 0.95 |
| $P_2O_5$ |  |  | 1.30 |  |
| $Nd_2O_3$ |  |  |  | 0.2800 |
| CoO |  |  |  |  |
| $Fe_2O_3$ | 0.0100 | 0.0140 | 0.0160 | 0.0150 |
| $T_{300poises}$ (°C.) | 1686 | 1598 | 1650 |  |
| $T_{liq}$ (°C.) |  |  | 1340-1350 |  |
| Viscosity at $T_{liq}$ (poises) |  |  | 9480-8210 |  |
| Ceramming | P | P | P |  |
| Optical properties (5 mm) |  |  |  |  |
| TL (%) | 83.4 | 84.2 | 87.0 | 78.6 |
| YI | 10.6 | 11.5 | 11.4 | 8.0 |
| Diffusion (%) | 0.7 | 0.2 | 0.7 | 1.1 |
| β-quartz % (nm) | 96.8 (30) | 94.6 (26) | 93.6 (32) | 93.4 (46) |

TABLE 1-E-continued

|  | Example 17 | Example 18 | A | B |
|---|---|---|---|---|
| $CTE_{25\text{-}700°C}$ ($\times 10^{-7} K^{\times 1}$) | 5.6 | −1.7 | | |

TABLE 1-F

|  | C1 | C2 | C3 | C4 |
|---|---|---|---|---|
| $SiO_2$ | 65.288 | 66.588 | 66.488 | 70.388 |
| $Al_2O_3$ | 21.00 | 21.00 | 20.50 | 21.00 |
| $Li_2O$ | 3.50 | 3.50 | 3.50 | 3.50 |
| MgO | 1.00 |  | 1.20 |  |
| ZnO | 1.60 | 1.60 | 1.60 |  |
| $TiO_2$ | 2.60 | 2.60 | 1.80 | 2.60 |
| $ZrO_2$ | 1.70 | 1.40 | 1.70 | 1.70 |
| $SnO_2$ | 0.30 | 0.30 | 1.20 | 0.30 |
| $As_2O_3$ |  |  |  |  |
| BaO | 2.50 | 2.50 | 2.00 |  |
| ZnO + BaO + SrO | 4.10 | 4.10 | 3.60 |  |
| $Na_2O$ | 0.50 | 0.50 |  | 0.50 |
| $K_2O$ |  |  |  |  |
| $Na_2O + K_2O$ |  |  |  |  |
| $P_2O_5$ |  |  |  |  |
| $Nd_2O_3$ |  |  |  |  |
| CoO |  |  |  |  |
| $Fe_2O_3$ | 0.0120 | 0.0120 | 0.0120 | 0.0120 |
| $T_{300 poises}$ (°C.) |  |  |  | 1714 |
| $T_{liq}$ (°C.) |  |  |  |  |
| Viscosity at $T_{liq}$ (poises) |  |  |  |  |
| Ceramming | P | P | C |  |
| Optical properties (5 mm) |  |  |  |  |
| TL (%) | 82.6 | 67.6 | 80.9 |  |
| YI | 15.5 | 29.5 | 30.2 |  |
| Diffusion (%) | 0.8 | 8.1 | 0.9 |  |
| β-quartz β % (nm) | 94.8 (26) | 96.9 (36) | 94.9 (45) |  |
| $CTE_{25\text{-}700°C}$ ($\times 10^{-7} K^{-1}$) | 4.7 |  |  |  |

We claim:

1. A transparent, essentially colorless and non-diffusing glass-ceramic of the lithium aluminosilicate type containing a β-quartz solid solution as a main crystalline phase, wherein its composition, free of arsenic oxide, antimony oxide and rare earth oxides except for inevitable trace amounts, contains, expressed as percentages by weight of oxides:
   62-72% of $SiO_2$,
   20-23% of $Al_2O_3$,
   2.8-5% of $Li_2O$,
   0.1-0.6% of $SnO_2$,
   1.9-4% of $TiO_2$,
   1.6-3% of $ZrO_2$,
   less than 0.4% of MgO,
   2.5-6% of ZnO and/or BaO and/or SrO,
   less than 250 ppm of $Fe_2O_3$; and the crystallites present in said β-quartz solid solution have an average size of less than 35 nm.

2. The glass-ceramic according to claim 1, the composition of which contains less than 0.1% of MgO.

3. The glass-ceramic according to claim 1, the composition of which is free of MgO except for inevitable trace amounts.

4. The glass-ceramic according to claim 1, the composition of which contains from 3.5 to 5% of at least one of ZnO, BaO and SrO.

5. The glass-ceramic according to claim 1, the composition of which contains from 0.4 to 3% of ZnO, and from 0 to 5% of BaO.

6. The glass-ceramic according to claim 1, the composition of which contains from 0.4 to 3% of ZnO, from 2.1 to 5% of BaO and from 0 to 5% of SrO.

7. The glass-ceramic according to claim 1, the composition of which contains from 2.5 to 5% of BaO.

8. The glass-ceramic according to claim 1, the composition of which, expressed as percentages by weight of oxides, contains, for at least 97% of its weight:
   $SiO_2$ 62-72
   $Al_2O_3$ 20-23
   $Li_2O$ 2.8-5
   $TiO_2$ 1.9-4
   $ZrO_2$ 1.6-3
   $SnO_2$ 0.1-0.6
   MgO less than 0.4%
   ZnO 0.4-3
   BaO 0-5
   SrO 0-5
   CaO 0-1
   $Na_2O$ 0-1
   $K_2O$ 0-1
   $Fe_2O_3$ less than 250 ppm
   CoO 0-30 ppm and
   $P_2O_5$ 0-3.

9. The glass-ceramic according to claim 1, the composition of which, expressed as percentages by weight of oxides, contains, for at least 97% of its weight:
   $SiO_2$ 63-69
   $Al_2O_3$ 20-22
   $Li_2O$ 3-4.5
   $TiO_2$ 2-3
   $ZrO_2$ 1.6-2
   $SnO_2$ 0.1-0.4
   MgO less than 0.1%,
   ZnO 0.4-2
   BaO 2.1-5
   CaO 0-1
   $Na_2O$ 0-1
   $K_2O$ 0-1
   $Fe_2O_3$ less than 180 ppm
   CoO 0-10 ppm, and
   $P_2O_5$ 0-2.

10. The glass-ceramic according to claim 1, the composition of which, expressed as percentages by weight of oxides, contains, for at least 97% of its weight:
    $SiO_2$ 63-69
    $Al_2O_3$ 20-22
    $Li_2O$ 3-4
    $TiO_2$ 2-3
    $ZrO_2$ 1.6-2
    $SnO_2$ 0.1-0.4
    MgO less than 0.1%,
    ZnO 1.6-2
    BaO 2.1-5
    CaO 0-1
    $Na_2O$ 0-1
    $K_2O$ 0-1
    $Fe_2O_3$ less than 180 ppm
    CoO 0-10 ppm and
    $P_2O_5$ 0-2.

11. The glass-ceramic according to claim 1, having an integrated transmission for a thickness of 5 mm, of more than 81%, a yellow index for a thickness of 5 mm, of less than 14, and a diffusion percentage for a thickness of 5 mm, of less than 2.5%.

12. An article selected from the group consisting of a fireproof door, a fireproof window, a cooking top plate, and a shielding comprising a glass-ceramic according to claim 1.

13. A method for elaborating a glass-ceramic according to claim 1, comprising a heat treatment of a batch mixture of raw materials able to vitrify, containing $SnO_2$ as a fining agent, under conditions which ensure melting, fining and ceramming by a first nucleation step and a second crystal growth step, wherein said batch mixture has a composition with which a glass-ceramic having a composition that is free of arsenic oxide, antimony oxide and rare earth oxides except for inevitable trace amounts, and which contains, expressed as percentages by weight of oxides:

- 62-72% of $SiO_2$,
- 20-23% of $Al_2O_3$,
- 2.8-5% of $Li_2O$,
- 0.1-0.6% of $SnO_2$,
- 1.9-4% of $TiO_2$,
- 1.6-3% of $ZrO_2$,
- less than 0.4% of MgO,
- 2.5-6% of ZnO and/or BaO and/or SrO,
- and less than 250 ppm of $Fe_2O_3$ can be obtained, and wherein said ceramming is applied:
- in a temperature interval between 650 and 850° C., for 15 minutes to 4 hours for the nucleation step, and
- in a temperature interval between 860 and 935° C., for 10 minutes to 2 hours for the crystal growth step.

\* \* \* \* \*